US006943335B2

(12) United States Patent
Hashimoto (10) Patent No.: US 6,943,335 B2
(45) Date of Patent: Sep. 13, 2005

(54) SIGNAL PROCESSING APPARATUS HAVING A SPECIFIC LIMB DARKENING CORRECTION

(75) Inventor: Hitoshi Hashimoto, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 301 days.

(21) Appl. No.: 10/441,612

(22) Filed: May 20, 2003

(65) Prior Publication Data

US 2003/0220741 A1 Nov. 27, 2003

(30) Foreign Application Priority Data

May 23, 2002 (JP) ....................................... 2002-149653

(51) Int. Cl.[7] .............................................. H01L 27/00
(52) U.S. Cl. .................................. 250/208.1; 250/201.5
(58) Field of Search ........................... 250/208.1, 201.5, 250/201.7; 382/274, 275; 348/229, 228

(56) References Cited

U.S. PATENT DOCUMENTS 4,723,174 A * 2/1988 Nishikawa et al. ......... 358/446

FOREIGN PATENT DOCUMENTS

JP 11-164194 A 6/1999

* cited by examiner

*Primary Examiner*—David Porta
*Assistant Examiner*—Tony Lu
(74) *Attorney, Agent, or Firm*—Frishauf, Holtz, Goodman & Chick, P.C.

(57) ABSTRACT

A signal processing apparatus includes a lens, an image sensing device placed on an imaging plane of the lens, and a limb darkening correction section which corrects limb darkening only in the horizontal direction of the image sensing device with respect to a video signal of an object sensed by the image sensing device.

8 Claims, 6 Drawing Sheets

SIGNAL PROCESSING APPARATUS HAVING A SPECIFIC LIMB DARKENING CORRECTION

CROSS-REFERENCE TO RELATED APPLICATIONS

This application is based upon and claims the benefit of priority from the prior Japanese Patent Application No. 2002-149653, filed May 23, 2002, the entire contents of which are incorporated herein by reference.

BACKGROUND OF THE INVENTION

1. Field of the Invention

The present invention relates to a signal processing apparatus and signal processing program which correct limb darkening.

2. Description of the Related Art

The brightness of an image formed by a lens gradually decreases from the optical axis center of the lens to its edge. This phenomenon is called limb darkening. Light incident on the lens at an angle $\theta$ with respect to the optical axis is formed into an image at a position shifted from the lens center. The brightness of this image is proportional to $\cos^4 \theta$.

As a method or apparatus for correcting this limb darkening, for example, the technique disclosed in Jpn. Pat. Appln. KOKAI Publication No. 11-164194 is known.

In this method, a two-dimensional plane coordinate system having its origin at the optical axis center of an imaging plane is defined. The brightness of an image at the position of a point (x, y) in the two-dimensional plane coordinate system is corrected by using a correction expression using a distance R from the origin as a parameter. This reference also discloses a technique for performing limb darkening correction processing for each of the colors R, G, and B.

In this method, however, multiplication or square root extraction must be performed a plurality of number of times with respect to all points (x, y). It therefore takes much time to perform limb darkening correction, interfering with high-speed operation. In addition, this complicates the arrangement of an apparatus for realizing this limb darkening correction.

In addition, limb darkening correction processing for each of the colors R, G, and B requires much processing time because limb darkening correction processing is repeated for each color. If correction is to be made by using different limb darkening correction ratios for the respective colors, the arrangement of an apparatus for executing the processing becomes complicated.

BRIEF SUMMARY OF THE INVENTION

A signal processing apparatus according to an aspect of the present invention comprises a lens, an image sensing device placed on an imaging plane of the lens, and a limb darkening correction section which corrects limb darkening only in the horizontal direction of the image sensing device with respect to a video signal of an object sensed by the image sensing device.

Advantages of the present invention will be set forth in the description which follows, and in part will be obvious from the description, or may be learned by practice of the present invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

A limb darkening correction method according to the present invention will be described first.

Figure 1:
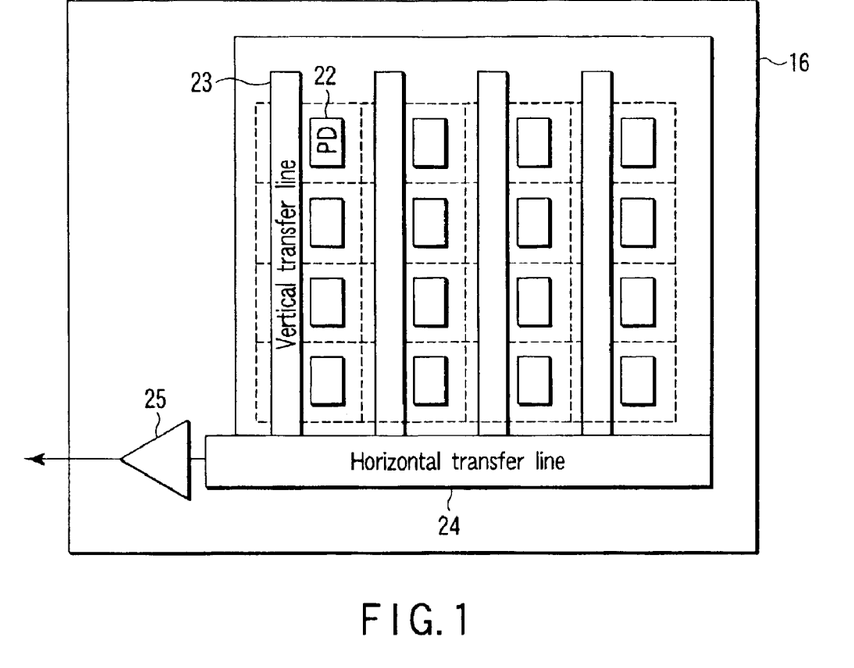
FIG. 1 is a view showing the arrangement of a CCD.

Solid-state image sensing devices such as CCDs are frequently used for electronic cameras. FIG. 1 is a view showing the arrangement of a CCD.

A CCD 16 is comprised of photosensor (PD) 22 arranged in the form of a matrix in an image sensing area, vertical transfer lines 23, horizontal transfer line 24, and output amplifier 25.

The vertical transfer lines 23 are registers for reading stored charges from the respective photosensor 22 and transferring them in the vertical direction. The horizontal transfer line 24 is a register for transferring the charges, transferred from the vertical transfer lines 23, in the horizontal direction. The output amplifier 25 converts the charges transferred from the horizontal transfer line 24 into a voltage and amplifies it.

In general, the photoelectric conversion section of the CCD is surrounded by electrodes, shields, and the like. Vertically incident light therefore strikes the photoelectric conversion section without being blocked by the electrodes and the like. However, obliquely incident light is partly blocked by the surrounding electrodes and the like. As a consequence, the incident light is attenuated as well as being attenuated due to the influence of the image sensing lens alone.

In the interline CCD shown in FIG. 1, the arrays of the photosensor 22 and the vertical transfer lines 23 are alternately arranged. Therefore, since there are small spaces in the horizontal direction of the photosensor 22, the shape of each photosensor 22 is longer in the vertical direction than in the horizontal direction. Since the photosensor 22 differs in light reception length depending on the vertical and horizontal directions, the influence of limb darkening due to incident angle is larger in the horizontal direction than in the vertical direction.

Figure 2:
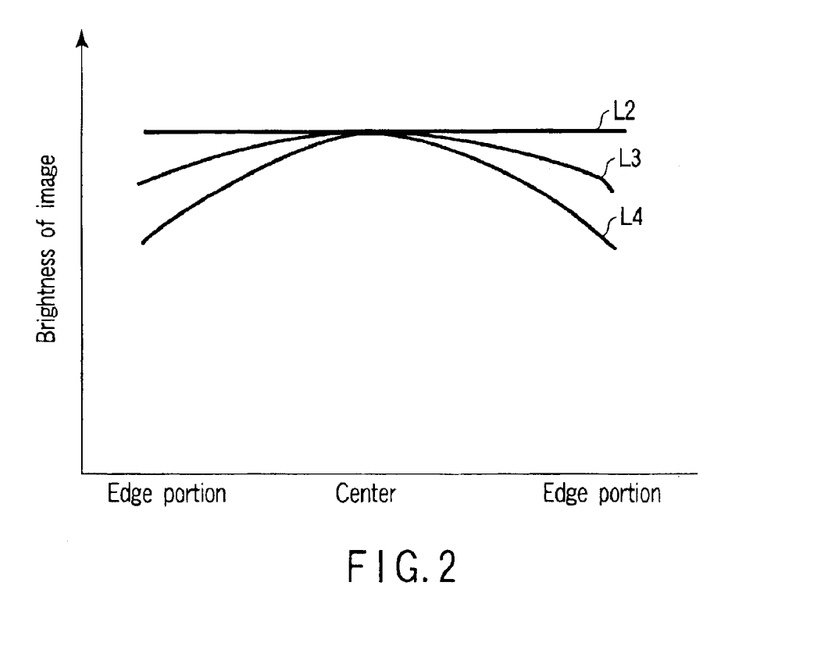
FIG. 2 is a graph showing darkening characteristics of the CCD.

FIG. 2 is a graph showing the limb darkening characteristics of the CCD.

As described above, the limb darkening characteristics of image formation include two characteristics, i.e., the characteristic in the vertical direction indicated by a curve L3 and the characteristic in the horizontal direction indicated by a curve L4. In this graph, "L2" indicates the brightness in an ideal state without limb darkening. In a limb darkening correction method, therefore, an improvement in image quality can be expected even by performing limb darkening correction in only one direction instead of performing limb darkening correction in both the vertical and horizontal directions.

Assume that the influence of limb darkening in the horizontal direction is strong as in the above interline CCD. In this case, if limb darkening correction is to be performed in only one direction, it is advantageous to perform limb darkening correction in the horizontal direction.

Figure 3:
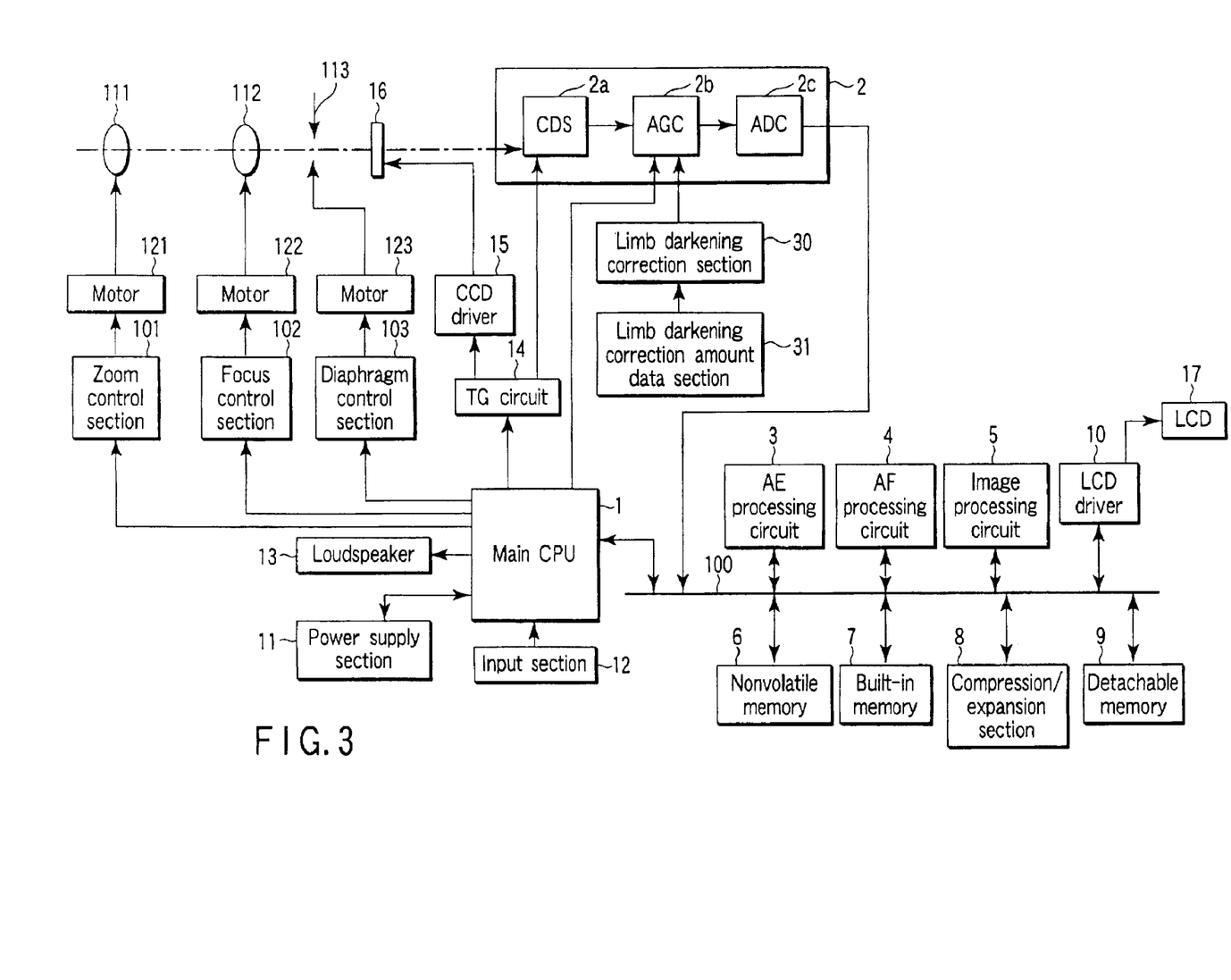
FIG. 3 is a block diagram showing the arrangement of an imaging apparatus using the signal processing apparatus according to the first embodiment of the present invention.

FIG. 3 is a block diagram showing the arrangement of an imaging apparatus using the signal processing apparatus according to the first embodiment of the present invention.

The imaging apparatus includes a lens group constituted by a zoom lens 111 and focus lens 112, a diaphragm mechanism 113, the CCD 16, an imaging circuit 2, an AE processing section 3, an AF processing section 4, an image processing circuit 5, a nonvolatile memory 6, a built-in memory 7, a compression/expansion section 8, a detachable memory 9, and an LCD driver 10.

The diaphragm mechanism 113 controls exposure. The CCD 16 converts an object image into an electrical signal. The imaging circuit 2 converts an electrical signal from the CCD 16 into a digital signal. The AE processing section 3, AF processing section 4, and image processing circuit 5 are connected to a signal bus 100 and perform various types of processing with respect to the digital signal.

This imaging apparatus also include a main CPU 1, input section 12, LCD 17, limb darkening correction section 30, limb darkening correction data section 31, zoom control section 101, focus control section 102, motors 121 and 122, diaphragm control section 103, motor 123, TG circuit 14, CCD driver 15, loudspeaker 13, and power supply section 11.

The main CPU 1 systematically controls the respective sections. The input section 12 has various operation switches. The LCD 17 displays images, operation states, and the like. The limb darkening correction section 30 corrects limb darkening. The limb darkening correction data section 31 stores data for correcting limb darkening. The zoom control section 101, focus control section 102, and motors 121 and 122 drive/control the lens. The diaphragm control section 103 and motor 123 control the diaphragm mechanism 113. The TG circuit 14 and CCD driver 15 control the CCD 16.

The imaging circuit 2 has a CDS 2a, AGC 2b, and ADC 2c. The CDS 2a removes fluctuation components by correlation double sampling. The AGC 2b automatically controls gain. The ADC 2c converts an analog signal into a digital signal.

In this imaging apparatus, the main CPU 1 systematically supervises all control operations. The main CPU 1 controls exposure processing, signal read operation of the CCD 16 by drive/control operation, a series of operations associated with image processing, and limb darkening correction processing.

The general operation of the imaging apparatus will be described next.

The input section 12 includes various types of operation switches such as a zoom lever, release SW, and power switch. In this case, when a photographer presses the release SW to the first position, the AE processing section 3 starts automatic exposure operation.

The AE processing section 3 receives image signals from the imaging circuit 2. The AE processing section 3 calculates an AE evaluation value by integrating image signals corresponding to a predetermined area, and transmits the value to the main CPU 1.

The main CPU 1 compares the AE evaluation value with an internal reference value. Upon determining, for example, that the brightness of the object is low, the main CPU 1 increases the amplification factor of the imaging circuit 2 through the TG circuit 14 or instructs the diaphragm control section 103 to open the diaphragm mechanism 113. In this manner, proper exposure control is executed.

The AF processing section 4 then starts automatic focusing operation. The AF processing section 4 receives image signals from the imaging circuit 2. The AF processing section 4 extracts high-frequency components from the image signals by filter processing. The AF processing section 4 then calculates an AF evaluation value or contrast value by integrating the high-frequency components and transmits the value to the main CPU 1. The main CPU 1 controls the drive of the motor 122 with respect to the focus control section 102 so as to maximize the AF evaluation value. In this manner, focusing control is executed.

When the photographer presses the release SW to the second position, normal photographing operation is started.

An object image is formed on the image sensing device 16 through the zoom lens 111, focus lens 112, and diaphragm mechanism 113. The imaging signal generated by the image sensing device 16 is input to the imaging circuit 2 to be subjected to processing such as CDS (Correlation Double Sampling) processing and signal amplification. Thereafter, the signal is converted into a digital signal and output to the signal bus 100.

The AE processing section 3, AF processing section 4, image processing circuit 5, nonvolatile memory 6, built-in memory 7, compression/expansion section 8, detachable memory 9, LCD driver 10, and the like are connected to the signal bus 100.

The image data from the imaging circuit 2 is temporarily buffered in the built-in memory 7. The data is then subjected to Y/C processing, color matrix processing, and the like in the image processing circuit 5. The resultant image is compressed by the compression/expansion section 8 and stored in the detachable memory 9. The image data from the imaging circuit 2 is input as a video signal to the LCD driver 10 and displayed as a through-image on the LCD 17.

When the photographer performs the operation of playing back a recorded image, image data stored in the detachable memory 9 is read out and expanded by the compression/expansion section 8. The image data is then converted into an image with a required size by the image processing circuit 5 and input to the LCD driver 10 to be displayed on the LCD 17.

Note that the nonvolatile memory 6 stores various programs or set values for executing the respective processes described above.

Limb darkening correction in this embodiment is implemented by making the limb darkening correction section 30 control the gain of the AGC 2b with respect to a signal from which fluctuation components are removed by the CDS 2a in the imaging circuit 2 as described above.

Figure 4:
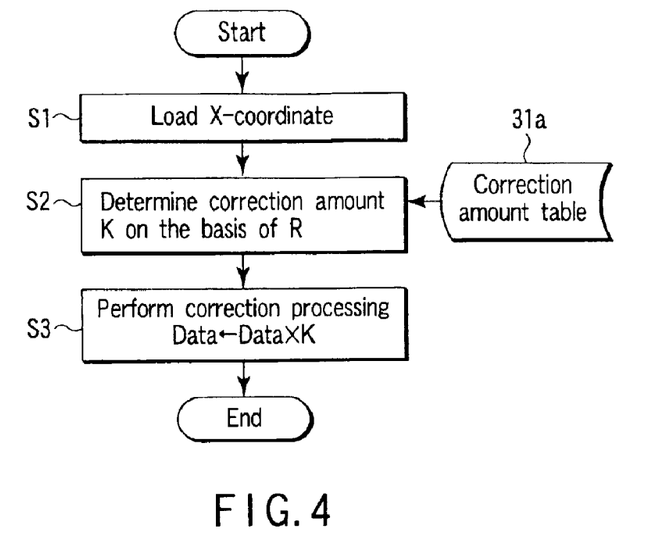
FIG. 4 is a flow chart showing the correction operation of a limb darkening correction section.

FIG. 4 is a flow chart showing the correction operation of the limb darkening correction section 30.

Figure 5:
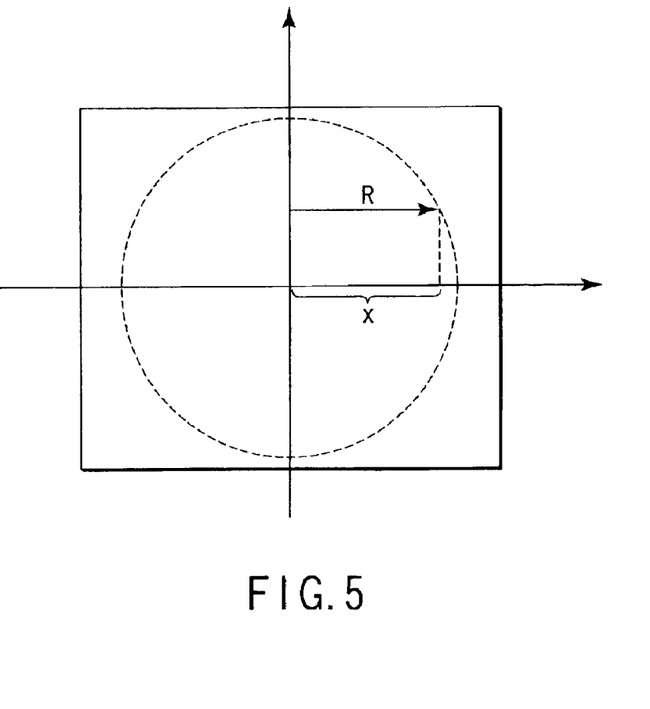
FIG. 5 is a view showing a distance R used for correction.

In step S1, the limb darkening correction section 30 loads an X-coordinate position corresponding to a sensed image sent from the CDS 2a. That is, the limb darkening correction section 30 loads only an X-coordinate position corresponding to the horizontal position of a point (x, y) in the two-dimensional plane coordinate system having its origin at the optical axis center of an imaging plane. FIG. 5 is a view showing a distance R used for correction. The distance R is represented by x as an X-coordinate position.

In step S2, a correction amount K is determined on the basis of the-distance R. The correction amount K is determined by referring to a correction amount table 31a set in the limb darkening correction data section 31. In step S3, the limb darkening correction section 30 changes the gain of the AGC 2b to multiply by K a video signal, of the imaging signal sent from the CDS 2a, which is located at the corresponding position.

Figure 6:
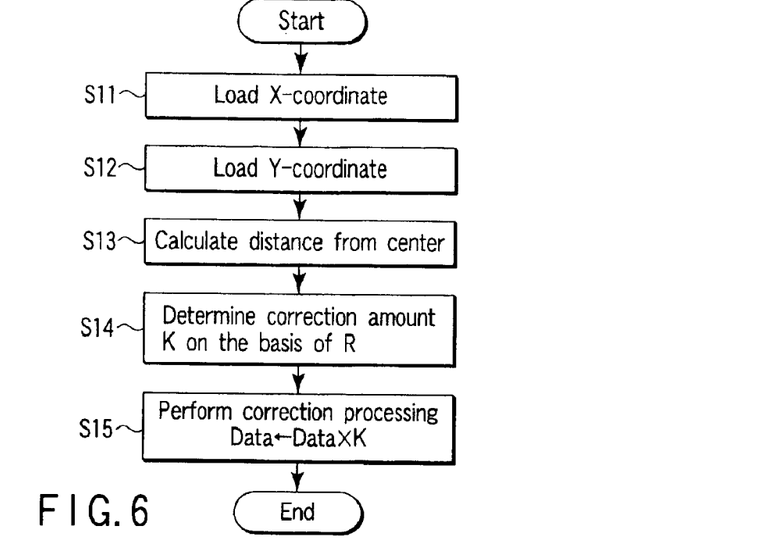
FIG. 6 is a flow chart showing conventional correction operation.

FIG. 6 is a flow chart showing conventional correction operation.

In steps S11 and S12, in the conventional method, the limb darkening correction section 30 loads X- and Y-coordinate positions corresponding to the imaging signal sent from the CDS 2a. That is, the limb darkening correction section 30 loads the X- and Y-coordinate positions of a point (x, y) in the two-dimensional plane coordinate system having its origin at the optical axis center of an imaging plane. In step S13, the distance R from the center is calculated from the Pythagorean theorem.

In step S14, the correction amount K is determined on the basis of the distance R. The correction amount K is determined by referring to the correction amount table 31a set in the limb darkening correction data section 31. The limb darkening correction section 30 changes the gain of the AGC 2b to multiply by k the signal sent from the CDS 2a.

In the conventional correction method, it is necessary to perform multiplication twice and then perform square root extraction. In the present invention, however, no such arithmetic processing is done. Therefore, the time required for correction processing can be shortened. In addition, the arrangement of the limb darkening correction section 30 can be simplified.

In the first embodiment, after the gain of a imaging signal is controlled by the AGC 2b, analog to digital conversion is performed by the ADC 2c. This arrangement can increase the precision of gray-level expression.

Figure 7:
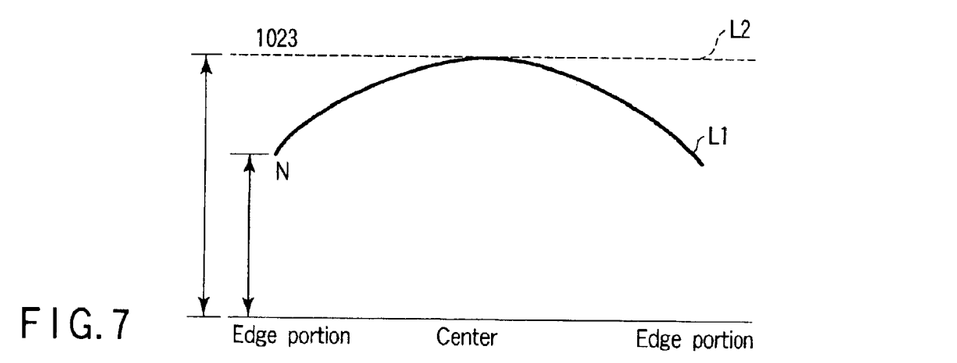
FIG. 7 is a view for explaining a merit in performing AGC before ADC.

FIG. 7 is a view for explaining a merit in performing ADC (Analog to Digital Conversion) is performed after AGC (Automatic Gain Control).

When a 10-bit A/D converter is to be used as the ADC 2c, 1,024 gray-level expression can be realized. Referring to FIG. 7, the LSB at the center of the light-receiving surface is at the 1,023rd gray level, whereas the LSB at an edge portion is at the Nth gray level. If A/D conversion is performed first, an edge portion can only be expressed with (N+1) gray levels even though a central portion can be expressed with 1,024 gray levels. If A/D conversion is performed after limb darkening correction is performed by the CDS 2a, both a central portion and an edge portion can be expressed with similar grayscale precision.

A method of correcting limb darkening with respect to color data will be described next.

In general, an IR cut filter matched with the sensitivity of a human eye is provided on the photosensor 22 of the CCD 16. A deposition type IR cut filter has a structure in which thin films are stacked on each other. With this structure, spectral characteristics as designed can be obtained with respect to vertically incident light beams. However, spectral characteristics as designed cannot be obtained with respect to obliquely incident light. As a consequence, the brightness of incident light is further decreased due to the influences of the image sensing lens alone.

Figure 8:
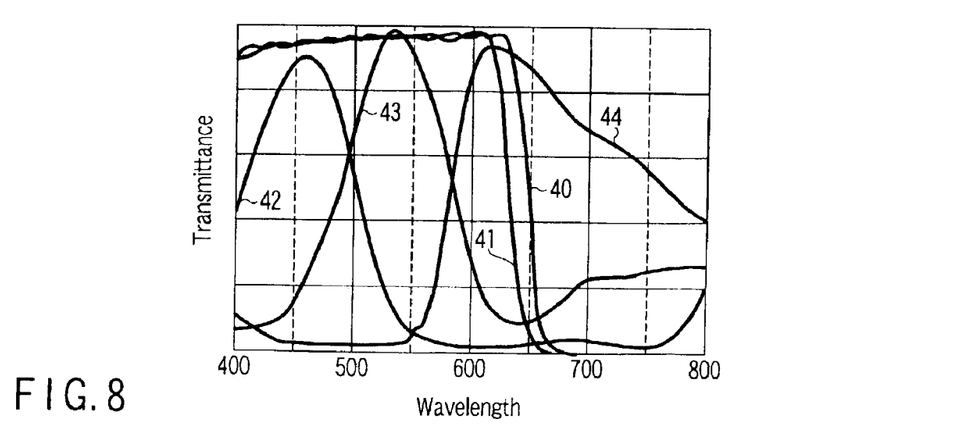
FIG. 8 is a graph showing the spectral transmittance characteristics of a CCD alone and IR cut filter alone.

FIG. 8 is a graph showing the spectral transmittance characteristics of a CCD alone and IR cut filter alone.

Referring to FIG. 8, the abscissa represents the wavelength of light; and the ordinate, the transmittance. Curves 40 and 41 are spectral transmittance curves of the IR cut filter alone. The curve 40 represents the transmittance obtained when a light beam is incident on the IR cut filter at incident angle=0°, i.e., incident vertically. The curve 41 represents the transmittance obtained when a light beam is incident on the IR cut filter at incident angle=10°. Curves 42 to 44 are spectral transmittance curves of the CCD alone, and respectively represent the transmittances for blue (B), green (G), and red (R) light beams.

It is obvious from FIG. 8 that as the incident angle of a light beam changes from 0° to 10°, the transmittance characteristics of the IR cut filter change so as to decrease the transmittance with respect to light having a wavelength of 600 to 700 nm.

Figure 9:
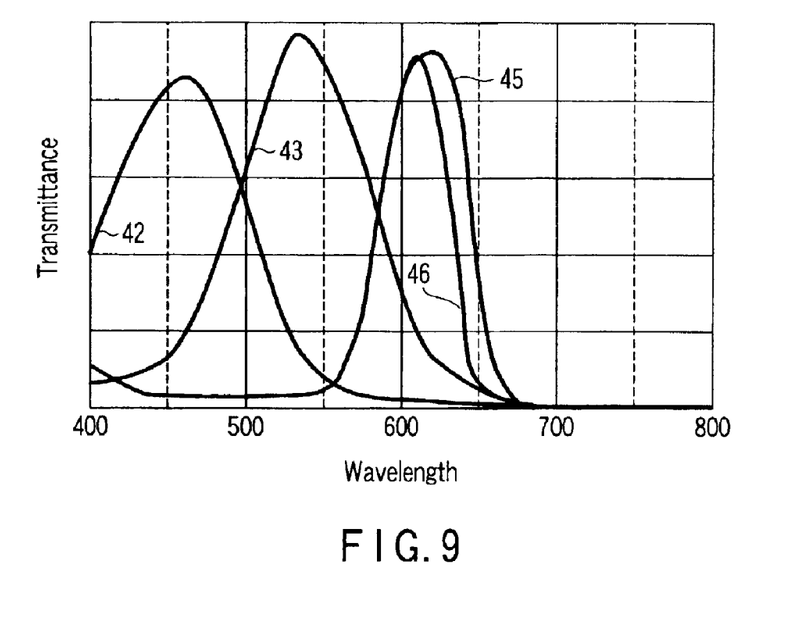
FIG. 9 is a graph showing the spectral transmission characteristics of a CCD having an IR cut filter.

FIG. 9 is a graph showing the spectral transmission characteristics of a CCD having an IR cut filter.

As the incident angle of a light beam changes from 0° to 10°, the transmittance for red (R) light changes from a curve 45 to a curve 46. It is therefore obvious that the R signal is affected most by the incident angle dependency of the IR cut filter.

Figure 10:
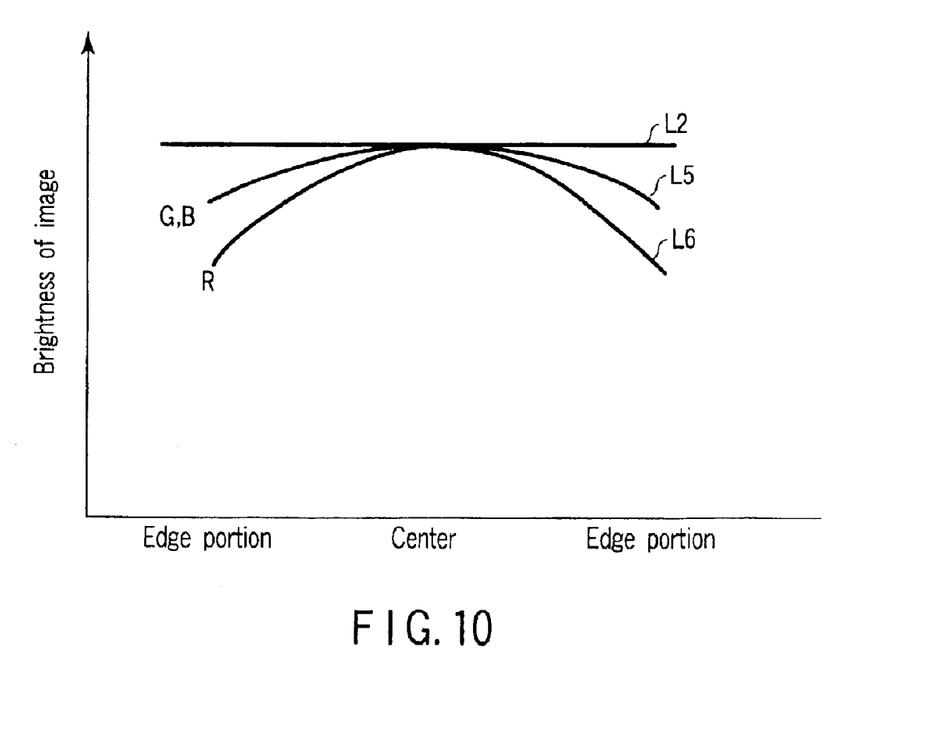
FIG. 10 is a graph showing the darkening characteristics of a CCD with respect to a color signal.

FIG. 10 is a graph showing the darkening characteristics of a CCD with respect to color signals.

As described above, the darkening characteristics of image formation are roughly classified into two characteristics, i.e., the darkening characteristic of G and B signals represented by a curve L5, and the darkening characteristic of an R signal represented by a curve L6. As a method of performing darkening correction for color signals, therefore, a method of performing correction upon discriminating the correction characteristics of an R signal from those of G and B signals is assumed. In addition, an improvement in image quality can be expected by performing darkening correction for only an R signal instead of performing any darkening correction for all R, G, and B signals.

Figure 11:
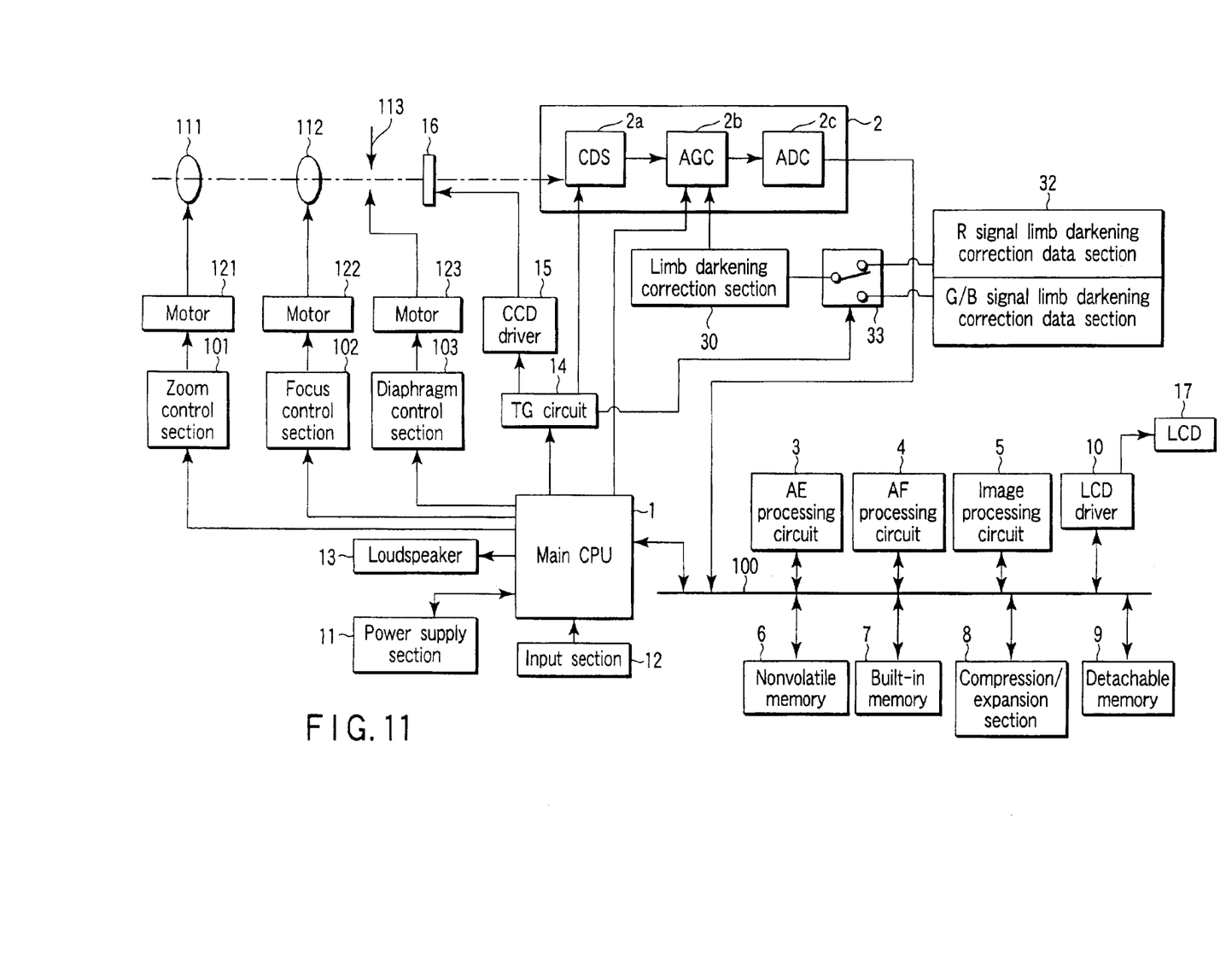
FIG. 11 is a block diagram showing the arrangement of an imaging apparatus using a signal processing apparatus according to the second embodiment of the present invention.

FIG. 11 is a block diagram showing the arrangement of an imaging apparatus using a signal processing apparatus according to the second embodiment of the present invention. The same reference numerals as in FIG. 11 denote the same parts in FIG. 3.

Unlike the first embodiment, the second embodiment has color signal limb darkening correction data sections 32 for an R signal and for G and B signals in place of the limb darkening correction amount data section 31. The color signal limb darkening correction data sections 32 are switched and used on the basis of a color identification signal from a TG circuit 14.

According to the second embodiment, since limb darkening correction data can be commonly used for G and B signals, the arrangement of the apparatus can be simplified.

As a modification of the second embodiment, an arrangement using only R signal limb darkening correction data to perform only limb darkening correction of an R signal may be used. With regard to a darkening correction method, the darkening characteristic of an R signal represented by a curve L6 in FIG. 10 may be corrected to match the darkening characteristic of the G and B signals represented by a curve L5, or the darkening characteristic of the R signal represented by the curve L6 may be corrected to match the ideal state represented by a curve L2.

According to the modification of the second embodiment, since limb darkening correction operation needs to be performed for only an R signal, the correction time can be shortened. In addition, since only R signal limb darkening correction data needs to be prepared, the arrangement of the apparatus can be simplified.

Note that each function according to the present invention may be implemented by being incorporated as a program in the main CPU 1 or may be implemented by using hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing apparatus comprising:
   a lens;
   an image sensing device placed on an imaging plane of the lens; and
   a limb darkening correction section which corrects limb darkening only in a horizontal direction of the image sensing device with respect to a video signal of an object sensed by the image sensing device.

2. An apparatus according to claim 1, further comprising an A/D conversion section which converts the video signal subjected to correction of limb darkening into a digital signal.

3. A signal processing apparatus comprising:
   a lens;
   an image sensing device placed on an imaging plane of the lens;
   a limb darkening correction section which corrects limb darkening of the image sensing device with respect to a color signal of an object sensed by the image sensing device;
   an R signal limb darkening correction data section which stores first correction data by which the limb darkening correction section corrects limb darkening with respect to an R signal of the color signal; and
   a G/B signal limb darkening correction data section which stores second correction data by which the limb darkening correction section corrects limb darkening with respect to G and B signals of the color signal.

4. An apparatus according to claim 3, wherein the limb darkening correction section corrects limb darkening only in the horizontal direction of the image sensing device.

5. An apparatus according to claim 4, further comprising an A/D conversion section which converts the color signal subjected to correction of limb darkening into a digital signal.

6. A signal processing apparatus comprising:
   a lens;
   an image sensing device placed on an imaging plane of the lens; and
   a limb darkening correction section which corrects limb darkening of the image sensing device with respect to a color signal of an object sensed by the image sensing device;
   wherein the limb darkening correction section corrects limb darkening with respect to only an R signal of the color signal.

7. An apparatus according to claim 6, wherein the limb darkening correction section corrects limb darkening only in a horizontal direction of the image sensing device.

8. An apparatus according to claim 7, further comprising an A/D conversion section which converts the color signal subjected to correction of limb darkening into a digital signal.

* * * * *